United States Patent
Kong (10) Patent No.: US 7,439,961 B2
(45) Date of Patent: Oct. 21, 2008

(54) APPARATUS AND METHOD FOR DRIVING TOUCH PANEL DEVICE

(75) Inventor: Nam Young Kong, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 786 days.

(21) Appl. No.: 10/606,846

(22) Filed: Jun. 27, 2003

(65) Prior Publication Data

US 2004/0090430 A1      May 13, 2004

(30) Foreign Application Priority Data

Nov. 13, 2002   (KR)   ............... 10-2002-0070306

(51) Int. Cl.
  G09G 5/00    (2006.01)
  G06K 11/06   (2006.01)

(52) U.S. Cl. ............. 345/173; 178/18.01; 178/18.03; 178/19.01; 178/19.04; 178/20.01

(58) Field of Classification Search ......... 345/173–179, 345/102, 207, 690; 178/18.01, 18.03, 18.05–18.07, 178/19.01, 19.04, 20.01; 349/61, 68, 106, 349/110; 362/561
See application file for complete search history.

(56) References Cited

U.S. PATENT DOCUMENTS

| | | | | |
|---|---|---|---|---|
| 5,956,020 A * | 9/1999 | D'Amico et al. | ............ | 345/173 |
| 5,995,084 A * | 11/1999 | Chan et al. | ............ | 345/173 |
| 6,061,051 A * | 5/2000 | Chan et al. | ............ | 345/173 |
| 6,611,257 B1 * | 8/2003 | Dotson et al. | ............ | 345/174 |
| 6,621,487 B2 * | 9/2003 | Iwasaki et al. | ............ | 345/173 |
| 6,765,558 B1 * | 7/2004 | Dotson | ............ | 345/173 |
| 6,816,153 B2 * | 11/2004 | Yamada et al. | ............ | 345/174 |

FOREIGN PATENT DOCUMENTS

| CN | 1139235 | 1/1997 |
|---|---|---|
| CN | 1142271 | 2/1997 |

OTHER PUBLICATIONS

Communication from Chinese Patent Office.

* cited by examiner

*Primary Examiner*—Henry N Tran
(74) *Attorney, Agent, or Firm*—McKenna Long & Aldridge LLP

(57) ABSTRACT

A driving apparatus of a touch panel includes a touch panel for generating a coordinate signal according to a position of a contact point, at least two interface integrated circuits connected to the touch panel, a computer system driving the touch panel and connected to any one of the at least two interface integrated circuits, a sensor for automatically detecting the interface integrated circuit connected to the computer system, and a controller for converting the coordinate signal in accordance with the interface integrated circuit detected at the sensor and transmitting the converted coordinate signal to the computer system.

14 Claims, 6 Drawing Sheets

APPARATUS AND METHOD FOR DRIVING TOUCH PANEL DEVICE

The present invention claims the benefit of Korean Patent Application No. P2002-70306 filed in Korea on Nov. 13, 2002, which is hereby incorporated by reference.

BACKGROUND OF THE INVENTION

1. Field of the Invention

The present invention relates to a touch panel device, and more particularly to an apparatus and method for driving a touch panel device.

2. Description of the Related Art

In general, touch panel devices are considered computer peripherals that are installed on a display surface of display devices, such as cathode ray tube (CRT) devices, liquid crystal display (LCD) devices, field emission display (FED) devices, plasma display panel (PDP) devices, and electroluminescence display (ELD) devices. As a user applies pressure onto the touch panel while looking at the display device, predetermined information is input into a computer.

Figure 1:
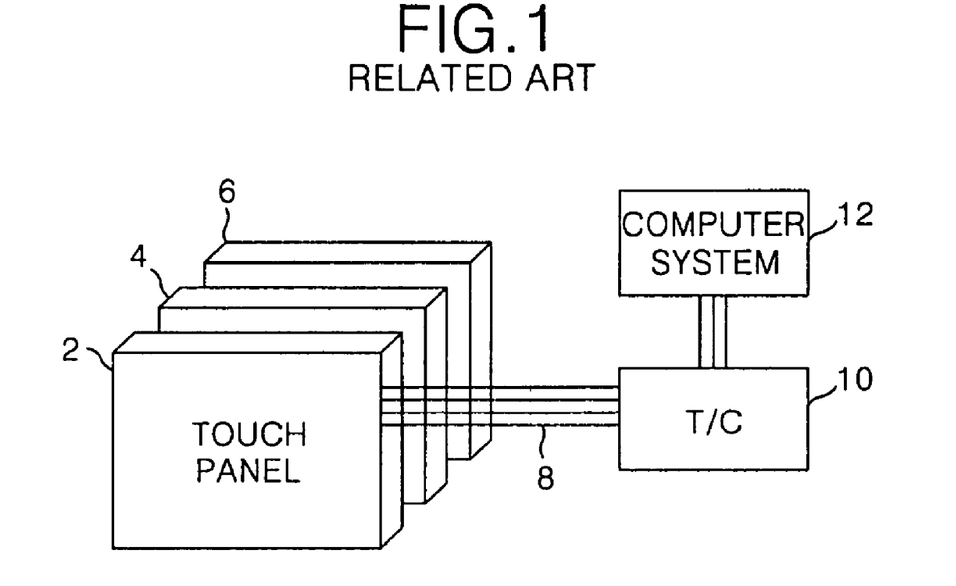
FIG. 1 is a schematic diagram of a touch panel device incorporated with a liquid crystal display panel according to the related art.

FIG. 1 is a schematic diagram of touch panel device incorporated with a liquid crystal display panel according to the related art. In FIG. 1, a liquid crystal display device and a touch panel device separately include a touch panel 2, a liquid crystal display panel 4, and a backlight device 6. In addition, a computer system 12 drives the touch panel 2 via and a touch controller 10 connected to the computer system 12, wherein a flexible printed circuit film FPC 8 interconnects the touch controller 10 and the touch panel 2.

The touch panel 2 receives power supplied from the touch controller 10 to apply a coordinate signal to the touch controller 10, wherein the coordinate signal is generated when a user presses the touch panel 2 with a stylus pen or a finger. Alternatively, the computer system 12 can be superseded with a main board of a personal computer. The computer system 12 supplies drive signals and video data necessary for the display panel and, at the same time, supplies power necessary for the touch panel 2 to control the display panel and the touch panel 2.

Figure 2:
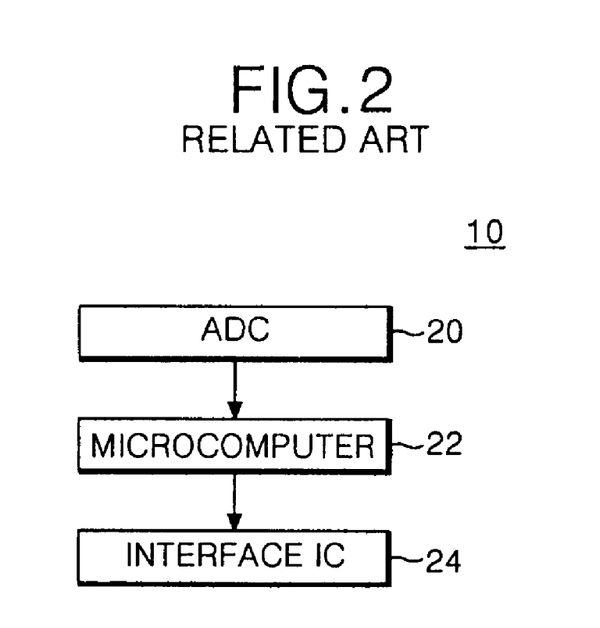
FIG. 2 is a schematic diagram of the touch controller of FIG. 1 according to the relate art.

FIG. 2 is a schematic diagram of the touch controller of FIG. 1 according to the related art. In FIG. 2, the touch controller 10 includes an analog-to-digital converter (ADC) 20 to convert an arbitrary analog voltage detected at the touch panel 2 into a digital voltage, a microcomputer 22 to respond to digital voltage values of an X-axis and a Y-axis converted by the ADC 20, and an interface integrated circuit (IC) 24 to make the microcomputer 22 compatible with the external computer system 12.

The ADC 20 converts the analog voltage value of an X-axis detected upon application of pressure to the touch panel 2 with the pen into the digital voltage value of the X-axis. Further, the ADC 20 converts the analog voltage value of a Y-axis detected upon application of pressure to the touch panel 2 with the pen into the digital voltage value of the Y-axis.

The microcomputer 22 receives the digital voltage values of the X-axis and the Y-axis converted by the ADC 20. Further, the microcomputer 22 switches the digital voltage value converted by the ADC 20 to the X-axis or the Y-coordinate. The interface IC 24 is connected between the microcomputer 22 and the computer system 12 of the liquid crystal display that has the touch panel 2 built within itself. The interface IC 24 transmits the voltage coordinate values to the computer system 12 connected to the touch panel 2, wherein the voltage value of the X-axis and the Y-axis converted by the ADC 20 is output in response to control of the microcomputer 22. The touch controller 10 converts the power supply voltage input from the computer system 12 into a power supply suitable for driving the touch panel 2 and, at the same time, supplies the coordinate signal input from the touch panel 2 to the computer system 12.

Figure 3:
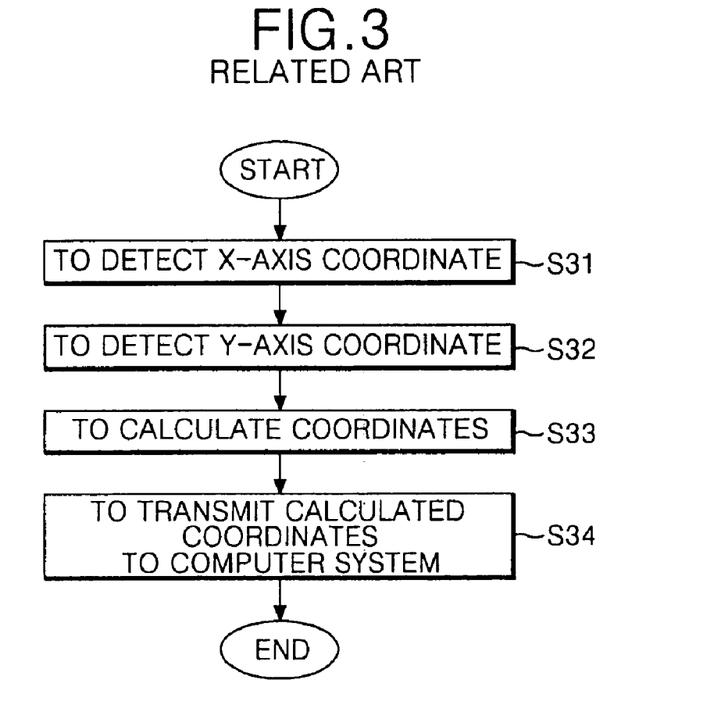
FIG. 3 is a flow chart of a method for driving a touch panel device according to the related art.

FIG. 3 is a flow chart of a method for driving a touch panel according to the related art. In FIG. 3, a microcomputer 22 (in FIG. 2) is set to be an X-axis coordinate mode in order to detect an X-axis coordinate. A potential coordinate of the set X-axis coordinate mode has a different voltage value in accordance with a location where a first electrode layer and a second electrode layer of the touch panel is pressed together to be shorted.

In step S31, the voltage value is the X-axis voltage value at the pressed point. Then, the microcomputer 22 (in FIG. 2) is converted from the set X-axis coordinate mode to a Y-axis coordinate mode in order to detect the Y-axis coordinate. A potential coordinate of the converted Y-axis coordinate mode has a different voltage value in accordance with the location where the first electrode layer and the second electrode layer of the touch panel are pressed together to be shorted.

In step S32, the voltage value is the Y-axis voltage value at the pressed point.

In step S33, the microcomputer 22 (in FIG. 2) calculates X- and Y-coordinates in use of the detected X-axis and the detected Y-axis voltages.

In step S34, the calculated X- and Y-axis coordinates are transmitted to the computer system 12 connected to the display device of the touch panel through the interface IC.

Figure 4:
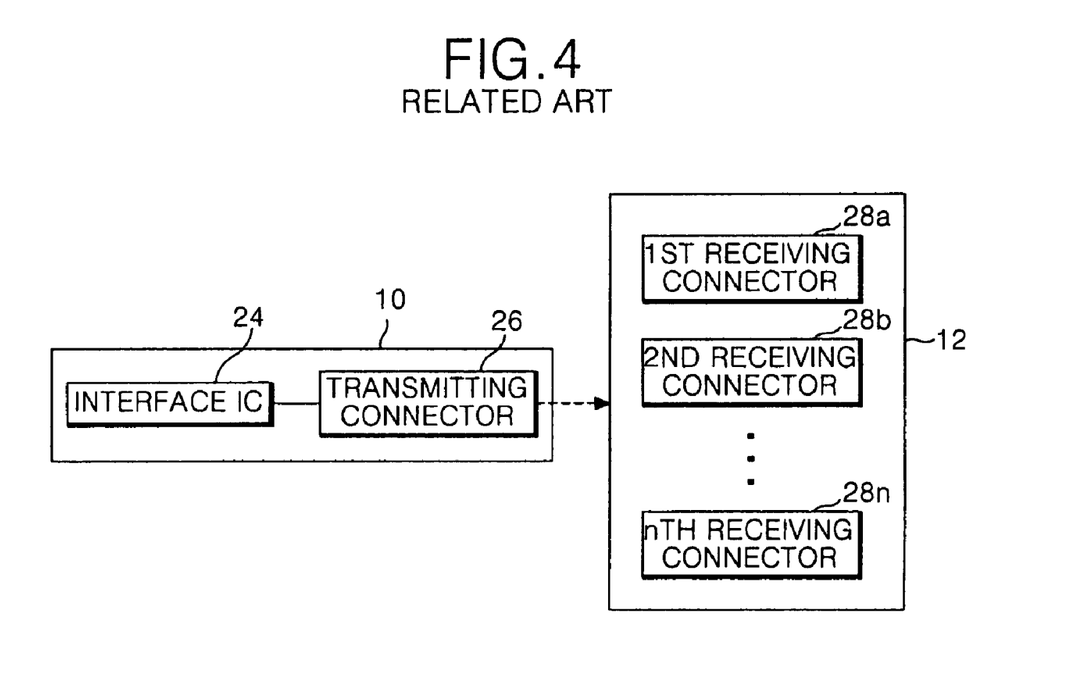
FIG. 4 is a schematic diagram of a transmitting connector and a receiving connector for interconnecting a touch controller with a computer system according to the related art.

FIG. 4 is a schematic diagram of a transmitting connector and a receiving connector for interconnecting a touch controller with a computer system according to the related art. In FIG. 4, the X- and Y-axis coordinates are transmitted to the computer system 12 through a transmitting connector 26 and a receiving connector 28 connected to the interface IC 24. Accordingly, the transmitting connector 26 is connected to the receiving connector corresponding to itself among a plurality of receiving connectors 28a to 28n. However, there is only one interface IC 24 in a touch board (not shown) where the touch controller 10 is formed. Accordingly, if the user has another interface IC, another touch controller is needed, thereby resulting in low compatibility. Furthermore, there is a problem in that one touch board is required for each interface IC 24.

SUMMARY OF THE INVENTION

Accordingly, the present invention is directed to an apparatus and a method for driving a touch panel device that substantially obviates one or more of the problems due to limitations and disadvantages of the related art.

An object of the present invention is to provide an apparatus for driving a touch panel device that is adaptive for increasing compatibility.

Another object of the present invention is to provide a method for driving a touch panel device that is adaptive for increasing compatibility.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a driving apparatus of a touch panel includes a touch panel for generating a coordinate signal according to a position of a contact point, at least two interface integrated circuits connected to the touch panel, a computer system driving the touch panel and connected to any one of the at least two interface integrated circuits, a sensor for automatically detecting the interface integrated circuit connected to the computer system, and a controller for converting the coordinate signal in accordance with the interface integrated circuit detected at the sensor and transmitting the converted coordinate signal to the computer system.

In another aspect, a method of driving a touch panel includes sensing an interface integrated circuit connected to a computer system among at least two interface integrated circuits, calculating a contact point as a coordinate value for a touch panel, converting the coordinate value in accordance with the interface integrated circuit, selecting the sensed interface integrated circuit, and transmitting the converted coordinate value to the computer system through the selected interface integrated circuit.

In another aspect, a method for driving a touch panel device includes generating a coordinate signal according to a position of a contact point, driving the touch panel to be connected to any one of at least two interface integrated circuits, automatically detecting the interface integrated circuit connected to a computer system, and converting the coordinate signal in accordance with the interface integrated circuit detected at a sensor and transmitting the converted coordinate signal to the computer system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
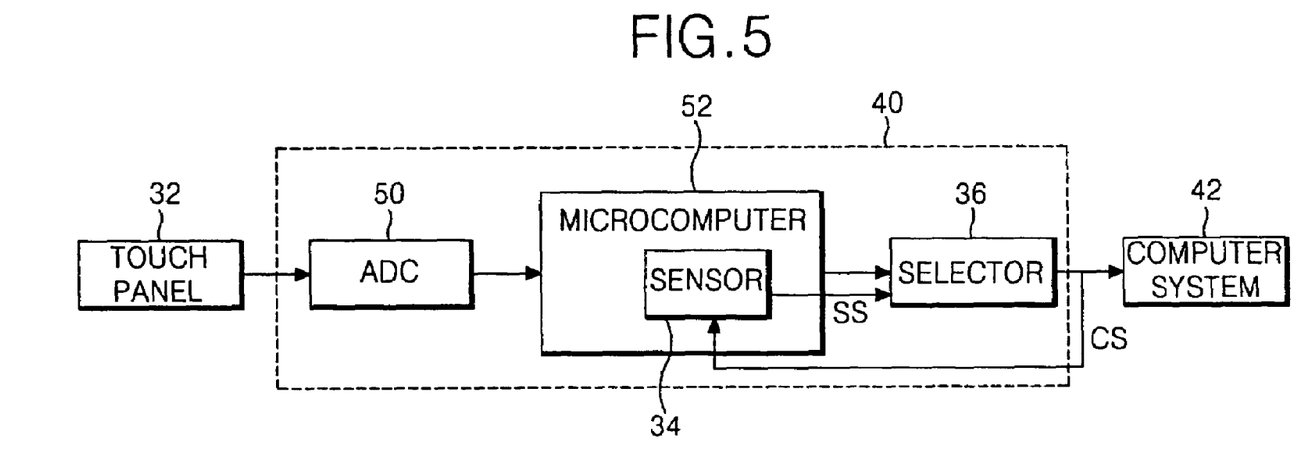
FIG. 5 is a schematic diagram of an exemplary driving apparatus of a touch panel device according to the present invention.

FIG. 5 is a schematic diagram of an exemplary driving apparatus of a touch panel device according to the present invention. In FIG. 5, a driving apparatus of a touch panel device may include a computer system 42 for driving a touch panel device 32 and a touch controller 40 connected to the computer system 42. The touch controller 40 may include an analog-to-digital converter (ADC) 50 for converting an arbitrary analog voltage detected at the touch panel device 32 into a digital voltage, a microcomputer 52 for responding to digital voltage values of an X-axis and a Y-axis converted by the ADC 50, and a selector 36 for choosing any one of interface integrated circuits (IC) that construct the microcomputer 52 that may be compatible with the external computer system 42.

The ADC 50 converts the analog voltage value of an X-axis detected upon application of pressure to the touch panel device 32 with a pen into the digital voltage value of the X-axis. In addition, the ADC 50 may convert the analog voltage value of a Y-axis detected upon application of pressure to the touch panel device 32 with the pen into the digital voltage value of the Y-axis.

The microcomputer 52 may receive the digital voltage values of the X-axis and the Y-axis converted by the ADC 50. In addition, the microcomputer 52 may switch the digital voltage value converted by the ADC 20 to the X- or Y-coordinate. The microcomputer 52 may include a sensor 34 to sense the interface IC that enables the computer system 42 to be compatible with the touch controller 40. For example, when employing an interface IC for RS232C communication in order to make the computer system 42 be compatible with the touch controller 40, the sensor 34 senses the presence of the interface IC in accordance with a high or low logic signal of Data Transfer Ready (DTR) of the fourth pin among nine pins of the transmitting connector connected to the touch controller 40. The process of sensing the interface IC may be performed before detecting the X- or Y-coordinates, so the digital voltage values of the X-axis and the Y-axis may be converted in accordance with the pertinent interface IC.

Figure 6:
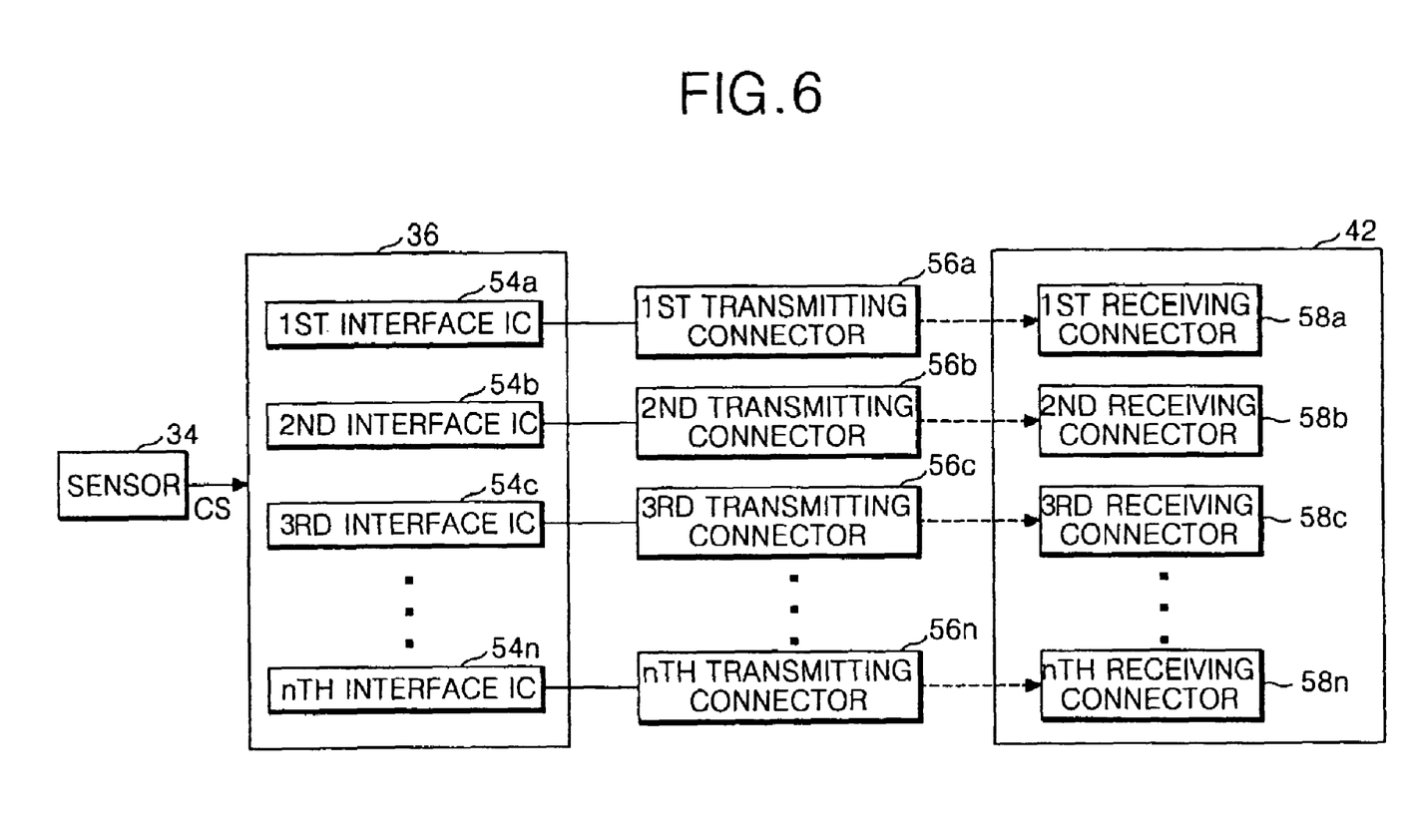
FIG. 6 is a schematic diagram of an exemplary touch controller of FIG. 5 according to the present invention.

FIG. 6 is a schematic diagram of an exemplary touch controller of FIG. 5 according to the present invention. In FIG. 6, the sensor 34 may sense the presence of the interface IC generates sense control signals CS and may transmit the generated signals to the selector 36. The selector 36 may include first to $n^{th}$ numbers of interface IC's 54a to 54n, wherein n is at least two. The selector 36 selects an interface IC corresponding to the sense control signal CS generated at the sensor 34 among the first to $n^{th}$ numbers of interface IC's 54a to 54n. Such at least two different interface IC's 54a to 54n may be mounted on one touch board (not shown) together with or on a separate touch board from the ADC 50 and the microcomputer 52

The first to $n^{th}$ numbers of interface IC's 54a to 54n may be connected to first to $n^{th}$ numbers of transmitting connectors 56a to 56n, respectively. The first to $n^{th}$ numbers of the transmitting connectors 56a to 56n may be connected to first to $n^{th}$ numbers of receiving connectors 58a to 58n of the computer system 42, respectively. For example, a $k^{th}$ number transmitting connector 56k connected to the interface IC selected at the selector 36 may be connected to the $k^{th}$ number receiving connector 58k formed at the computer system 42.

The first to $n^{th}$ numbers of interface IC's 54a to 54n located with the selector 36 may be connected between the microcomputer 52 and the computer system 42 of the liquid crystal display that has the touch panel device 32 incorporated therewithin. The first to $n^{th}$ numbers of interface IC's 54a to 54n may transmit the voltage coordinate value to the computer system 42 connected to the touch panel device 32, wherein the voltage value of the X-axis and the Y-axis converted by the ADC 50 may be output in response to control of the microcomputer 52. The touch controller 40 may convert the power supply voltage input from the computer system 42 into a power supply suitable for driving the touch panel device 32 and, at the same time, supply the coordinate signal input from the touch panel device 32 to the computer system 42.

The computer system 42 may be superseded with a main board of a personal computer, wherein the computer system 42 may supply drive signals and video data necessary for the display panel and, at the same time, supply power necessary for the touch panel device 32 to control the display panel and the touch panel device 32. The computer system 42 may include a plurality of receiving connectors 58 connected to a plurality of transmitting connectors 56 of the touch controller 40.

Figure 7:
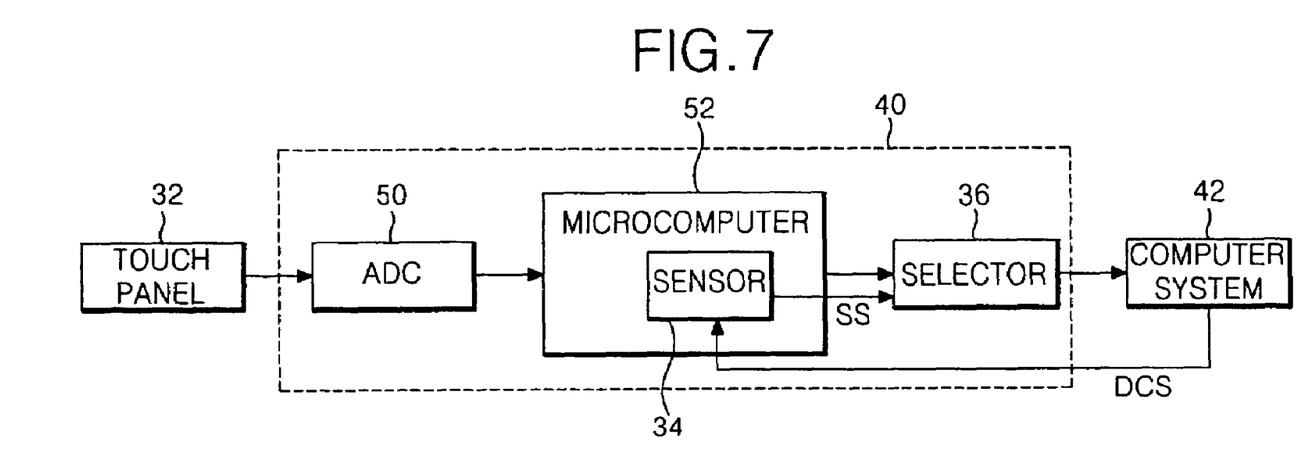
FIG. 7 is a schematic diagram of another exemplary driving apparatus of a touch panel device according to the present invention.

FIG. 7 is a schematic diagram of another exemplary driving apparatus of a touch panel device according to the present invention. In FIG. 7, a driving apparatus of a touch panel may include a computer system 42 to drive a touch panel device 32, and a touch controller 40 connected to the computer system 42. The touch controller 40 may include an analog-to-digital converter (ADC) 50 to convert an arbitrary analog voltage detected at the touch panel device 32 into a digital voltage, a microcomputer 52 to respond to digital voltage values of X-axis and Y-axis converted by the ADC 50, and a selector 36 to choose any one of interface integrated circuits (ICs) that make the microcomputer 52 compatible with the external computer system 42.

The ADC 50 converts the analog voltage value of an X-axis detected upon application of pressure to the touch panel device 32 with a pen into the digital voltage value of the X-axis. Further, the ADC 50 converts the analog voltage value of a Y-axis detected upon application of pressure to the touch panel device 32 with the pen into the digital voltage value of the Y-axis. The microcomputer 52 receives the digital voltage values of the X-axis and the Y-axis converted by the ADC 50. Further, the microcomputer 52 switches the digital voltage value converted by the ADC 20 to the X- or Y-coordinate.

The microcomputer 52 may include a sensor 34 to sense the interface IC 54 that enables the computer system 42 compatible with the touch controller 40. For example, when employing an interface IC for USB communication in order to make the computer system 42 be compatible with the touch controller 40, sense control signals DCS of data request signal generated at the computer system 42 are transmitted to the sensor 34 to sense the interface IC. The sensor 34 transmits selection control signals SS to the selector 36 in order to select the interface IC sensed at the sensor. The process of sensing the interface IC may be performed before detecting coordinates, so the digital voltage values of the X-axis and the Y-axis are converted in accordance with the pertinent interface IC.

The selector 36 (in FIG. 6) may include first to $n^{th}$ numbers of interface IC's 54a to 54n, wherein n is at least two. The selector 36 selects an interface IC corresponding to the sense control signal CS generated at the sensor 54 among the first to $n^{th}$ numbers of interface IC's 54a to 54n. Such at least two different interface IC's 54a to 54n may be mounted on one touch board (not shown) together with or on a separate touch board from the ADC 50 and the microcomputer 52 The first to $n^{th}$ numbers of interface IC's 54a to 54n may correspond to first to $n^{th}$ numbers of transmitting connectors 56a to 56n, respectively. The first to $n^{th}$ numbers of transmitting connectors 56a to 56n may be connected to first to $n^{th}$ numbers of receiving connectors 58a to 58n of the computer system 42, respectively. For example, a $k^{th}$ number transmitting connector 56K connected to the interface IC selected at the selector 36 may be connected to the $k^{th}$ number receiving connector 58K formed at the computer system 42. The first to $n^{th}$ numbers of interface IC's 54a to 54n located within the selector 36 may be connected between the microcomputer 52 and the computer system 42 of the liquid crystal display that has the touch panel device 32 built therewithin. The selected interface IC among the first to $n^{th}$ numbers of interface IC's 54a to 54n transmits the voltage coordinate value to the computer system 42 connected to the touch panel device 32, wherein the voltage value of the X-axis and the Y-axis converted by the ADC 50 is output in response to control of the microcomputer 52.

The touch controller 40 converts the power supply voltage input from the computer system 42 into a power supply suitable for driving the touch panel device 32 and, at the same time, supplies the coordinate signal input from the touch panel device 32 to the computer system 42. The computer system 42 can be superseded with a main board of a personal computer, wherein the computer system 42 supplies drive signals and video data necessary for the display panel and, at the same time, supplies power necessary for the touch panel device 32 to control the display panel and the touch panel device 32.

Figure 8:
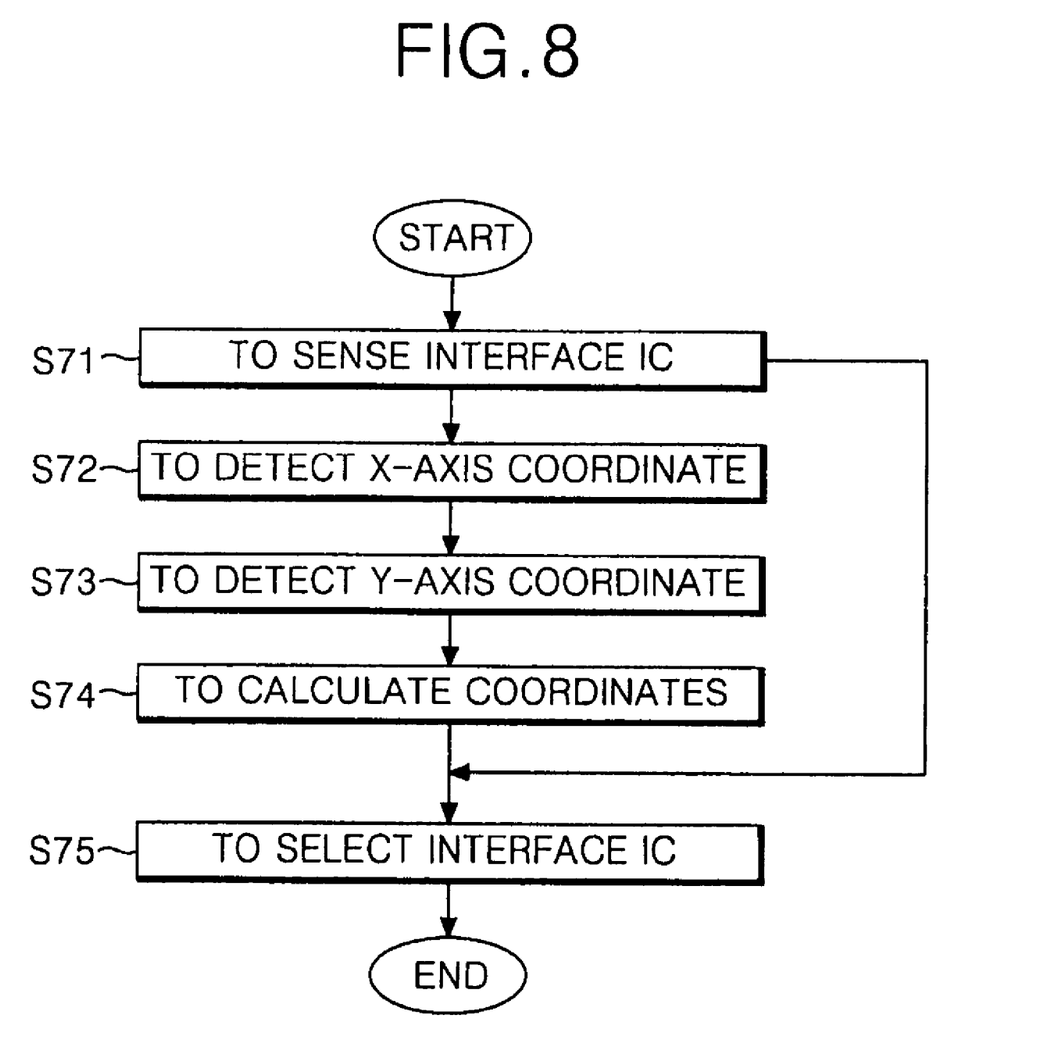
FIG. 8 is a flow chart of an exemplary driving method of a touch panel device according to the present invention.

FIG. 8 is a flow chart of an exemplary driving method of a touch panel device according to the present invention. In FIGS. 7 and 8, and at step S71, when any one of at least two interface IC's 54 (in FIG. 7) is connected to the computer system 42 through the transmitting connector and the receiving connector, the sensor 34 integrated within the microcomputer 52 senses the interface IC 54 that is compatible with the computer system 42. Accordingly, the sensor 34 senses the interface IC 54 automatically if the transmitting connector is connected to the receiving connector, or senses the interface IC by interface IC-sensing signal applied to the sensor 34.

In step S72, an ADC 50 detects a coordinate signal of an X-axis generated from the touch panel 32 by a touch of a user to convert the detected coordinate signal into a digital data in accordance with the sensed interface IC.

In step S73, the ADC 50 detects a coordinate signal of a Y-axis generated from the touch panel device 32 by the touch of the user to convert the detected coordinate signal into a digital data in accordance with the sensed interface IC.

In step S74, a coordinates value is calculated in combination with the X-axis and the Y-axis coordinate data from the ADC 50.

In step S75, the interface IC 54 sensed at the sensor 34 is selected to transmit the X- and Y-axis coordinate values to the computer system 42 connected to the display device of the touch panel device 32.

Figure 9:
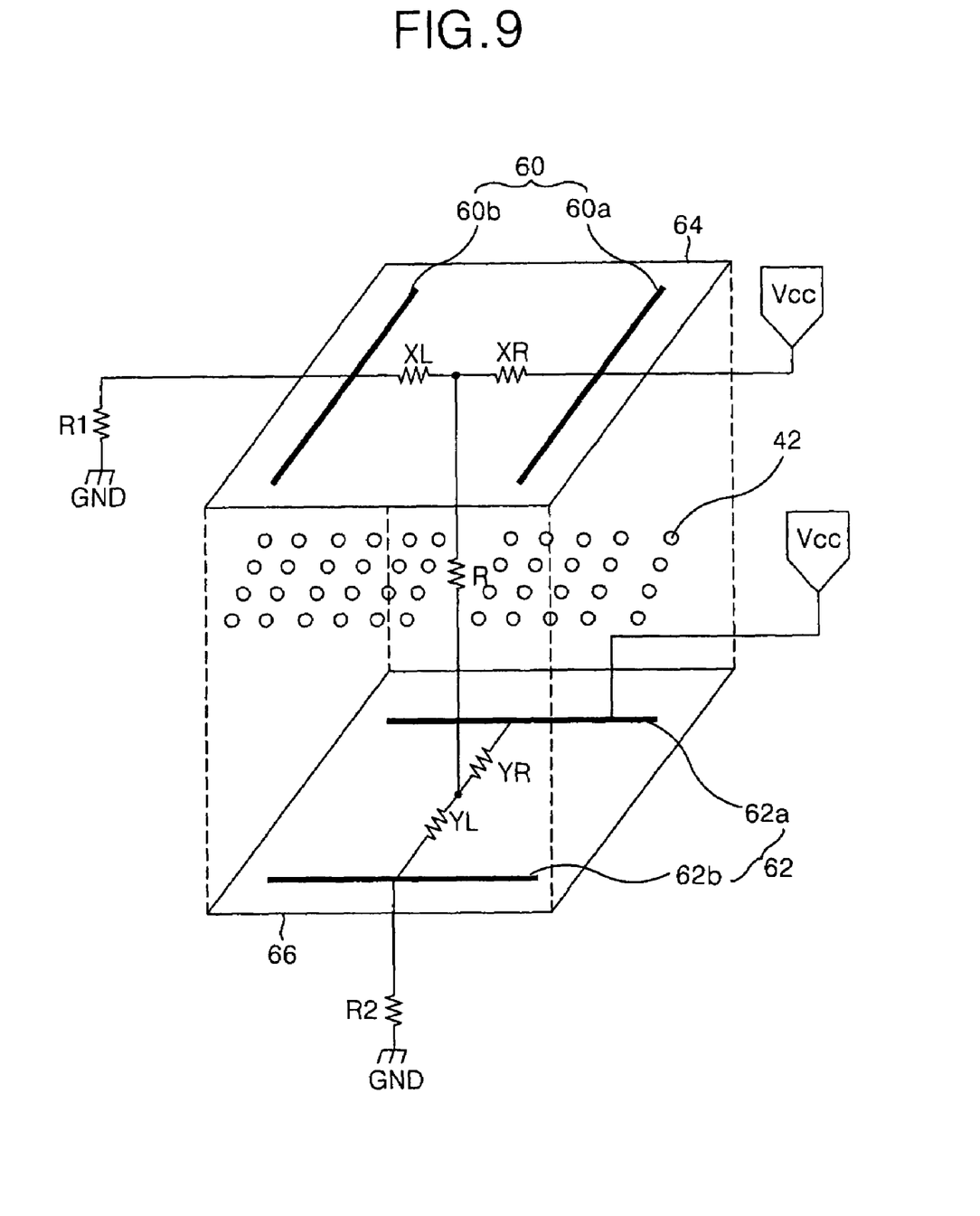
FIG. 9 is a perspective view of an exemplary touch panel device according to the present invention.

FIG. 9 is a perspective view of an exemplary touch panel device according to the present invention. In FIG. 9, a touch panel device 32 may include an upper substrate 64 where a first transparent conductive layer (not shown) is formed, and a lower substrate 66 where a second transparent conductive layer (not shown) is formed, wherein the lower substrate 66 is arranged separately from the upper substrate 64.

The upper substrate 64 and the lower substrate 66 may be bonded together by a sealant (not shown) spread along an outer area that is a non-touch area, and may be separated by a distance approximately equal to a height of the sealant. Further, a plurality of dot spacers 42 may be formed on the first transparent conductive layer of the upper substrate 64 or on the second transparent conductive layer of the lower substrate 66 in order to separate the upper substrate 64 and the lower substrate 66 within a touch area.

A transparent film of polyethylene terephthalate PET may be used as the upper substrate 64, which is pressed by a pen or a finger, and a transparent film of the same material may be used to form the upper substrate 64, and glass or plastic materials may be used to form the lower substrate 66. For example, any one of Indium Tin Oxide ITO, Indium Zinc Oxide IZO, or Indium Tin Zinc Oxide ITZO may be used to form the first and second transparent conductive layers.

The touch panel device 32 may further include an X-axis electrode bar 60 connected to both side parts of the first transparent conductive layer, and a Y-axis electrode bar 62 connected to both side parts of the second transparent conductive layer. The X-axis electrode bar 60 may include a first X-axis electrode bar 60A for supplying drive voltages Vcc and a second X-axis electrode bar 60B for supplying ground voltages GND to make current flow to the first transparent conductive layer along an X-axis direction. The Y-axis electrode bar 62 may include a first Y-axis electrode bar 62A for supplying drive voltages Vcc and a second Y-axis electrode bar 62B for supplying ground voltages GND to make current flow to the second transparent conductive layer along an Y-axis direction.

Resistance values of the touch panel device 32 may vary in accordance with a contact location when the pen and the finger is pressed on the upper substrate 64 to make the first transparent conductive layer come into electrical contact with the second transparent conductive layer. Since current or voltage changes in accordance with the varied resistant value, the touch panel device 32 outputs the change in current or voltage as an X-axis coordinate signal through the second X-axis electrode bar 60B connected to the first transparent conductive layer, and outputs a Y-axis coordinate signal through the second Y-axis electrode bar 62B connected to the second transparent conductive layer. In this case, the touch panel device 32 sequentially outputs the X-axis coordinate signal and the Y-axis coordinate signal.

In order to detect the X-axis voltage value of the touch panel 32, power supply Vcc may be supplied to the second X-axis electrode bar 60B and ground voltage source GND may be connected to the first X-axis electrode bar 60A through a first resistor R1. The touch panel device 32 may output the X-axis coordinate signal through the second X-axis electrode bar 60B in response to the changing resistance value in accordance with the contact point of the first and second transparent conductive layer if the drive voltage Vcc and the ground voltage GND are applied to the X-axis electrode bar 60.

Subsequently, in order to detect the Y-axis voltage value of the touch panel device 32, power supply Vcc may be supplied to the first Y-axis electrode bar 62A and ground voltage source GND is connected to the second Y-axis electrode bar 62B through a second resistor R2. The touch panel device 32 outputs the Y-axis coordinate signal through the second Y-axis electrode bar 62B in response to the changing resistance value in accordance with the contact point of the first and second transparent conductive layer if the drive voltage Vcc and the ground voltage GND are applied to the Y-axis electrode bar 62.

In a driving apparatus and method of the touch panel according to the present invention, the interface IC connected to the computer system among at least two different interface IC's may be prioritized by speed. The driving apparatus and method of the touch panel according to the present invention forms at least two interface IC's, senses the interface IC connected to the computer system, and transmits the X-axis and Y-axis coordinate signals through the interface IC. Accordingly, because the X-axis and the Y-axis coordinate signals can be transmitted to the computer system with the interface IC desired by the user, the compatibility is high. Further, the driving apparatus and method of the touch panel according to the present invention can obtain the integrity and simplicity of the touch board because at least two interface IC's are formed in one touch board.

It will be apparent to those skilled in the art that various modifications and variations can be made in the apparatus and method for driving a touch panel device without departing from the spirit or scope of the invention. Thus, it is intended that the present invention cover the modifications and variations of this invention provided they come within the scope of the appended claims and their equivalents.

What is claimed is:

1. A driving apparatus of a touch panel, comprising:
   a touch panel for generating a coordinate signal corresponding to a position of a contact point;
   a selector including at least two interface integrated circuits having communication standards different from each other, the at least two interface integrated circuits being formed in one touch controller;
   a computer system driving the touch panel and connected to any one of the at least two interface integrated circuits;
   a sensor for detecting the presence of the interface integrated circuit connected to the computer system among the at least two interface integrated circuits; and
   a controller for converting the coordinate signal into a coordinate value having X-axis and Y-axis suitable for the interface integrated circuit detected at the sensor and transmitting the coordinate value to the computer system,
   wherein the selector selects a communication channel between the controller and the interface integrated circuit connected to the computer system.

2. The driving apparatus according to claim 1, wherein at least one of the interface integrated circuit and the sensor is integrated with the controller.

3. The driving apparatus according to claim 1, wherein the controller includes:
   an analog-to-digital converter for converting an coordinate signal of analog input from the touch panel into a coordinate signal of digital; and
   a microcomputer for converting the digital coordinate signal into the coordinate value having X-axis and Y-axis suitable for the interface integrated circuit detected at the sensor.

4. The driving apparatus according to claim 3, wherein the sensor is integrated with the microcomputer.

5. The driving apparatus according to claim 1, further comprising:
   at least two transmitting connectors corresponding to the at least two interface integrated circuits; and
   at least two receiving connectors corresponding to the at least two transmitting connectors.

6. The driving apparatus according to claim 5, wherein the sensor senses the a sense control signal generated from the transmitting connector corresponding to the interface integrated circuit connected to the computer system when the transmitting connector is connected to the receiving connector corresponding to the transmitting connector.

7. The driving apparatus according to claim 5, wherein the sensor senses a sense control signal generated from the computer system when the transmitting connector corresponding to the interface integrated circuit connected to the computer system is connected to the receiving connector corresponding to the transmitting connector.

8. The driving apparatus according to claim 1, wherein the interface integrated circuit connected to the computer system includes USB communication.

9. The driving apparatus according to claim 1, wherein the interface integrated circuit connected to the computer system includes serial communication.

10. A method for driving a touch panel device, comprising:
generating a coordinate signal corresponding to a position of a contact point;
detecting the presence of an interface integrated circuit connected to a computer system among at least two interface integrated circuits having communication standards different from each other, the at least two interface integrated circuits being formed in one touch controller
converting the coordinate signal into a coordinate value having X-axis and Y-axis suitable for the interface integrated circuit detected at a sensor by a controller;
selecting a communication channel between the controller and the interface integrated circuit connected to the computer system; and
transmitting the coordinate value to the computer system via the communication channel and the interface integrated circuit connected to the computer system.

11. The method according to claim 10, wherein the step of converting includes:
converting a coordinate signal of an analog input from the touch panel into a digital coordinate signal;
converting the digital coordinate signal into the coordinate value having X-axis and Y-axis suitable for the interface integrated circuit detected at the sensor.

12. The method according to claim 10, wherein the steps of transmitting the coordinate value include serial communication.

13. The method according to claim 10, wherein the steps of transmitting the coordinate value include USB communication.

14. The method according to claim 13, wherein the step of detecting the presence of the interface integrated circuit includes transmitting a sense control signal generated from the computer system when the computer system is connected to the interface integrated circuit.

* * * * *